(No Model.)  9 Sheets—Sheet 1.

H. S. BAILEY.
ROW CHECKING CORN PLANTER.

No. 393,531. Patented Nov. 27, 1888.

Fig 1.

WITNESSES:
Josiah Albert Fowler,
Fred F. Hall.

INVENTOR:
Howard S. Bailey.

(No Model.) 9 Sheets—Sheet 3.

H. S. BAILEY.
ROW CHECKING CORN PLANTER.

No. 393,531. Patented Nov. 27, 1888.

WITNESSES:
Josiah Albert Fowler,
Fred F. Hall.

INVENTOR.
Howard S. Bailey.

(No Model.) 9 Sheets—Sheet 4.
H. S. BAILEY.
ROW CHECKING CORN PLANTER.

No. 393,531. Patented Nov. 27, 1888.

WITNESSES:
Josiah A. Fowler.
Fred F. Hall.

INVENTOR:
Howard S. Bailey.

UNITED STATES PATENT OFFICE.

HOWARD S. BAILEY, OF DENVER, COLORADO.

ROW-CHECKING CORN-PLANTER.

SPECIFICATION forming part of Letters Patent No. 393,531, dated November 27, 1888.

Application filed August 6, 1887. Serial No. 246,328. (No model.)

*To all whom it may concern:*

Be it known that I, HOWARD S. BAILEY, a citizen of the United States, residing at Denver, in the county of Arapahoe and State of Colorado, have invented a new and useful Universal Planter and Row-Checker, of which the following is a specification.

My invention relates to that class of planters designed to check their own rows; and the objects of my invention are, first, to provide a planter that will do perfect row-checking, and, second, to provide a planter that will plant seeds at equal depths on uneven ground. I attain these objects by the mechanism illustrated in the accompanying drawings, and described in the specification, in which—

Figure 1:
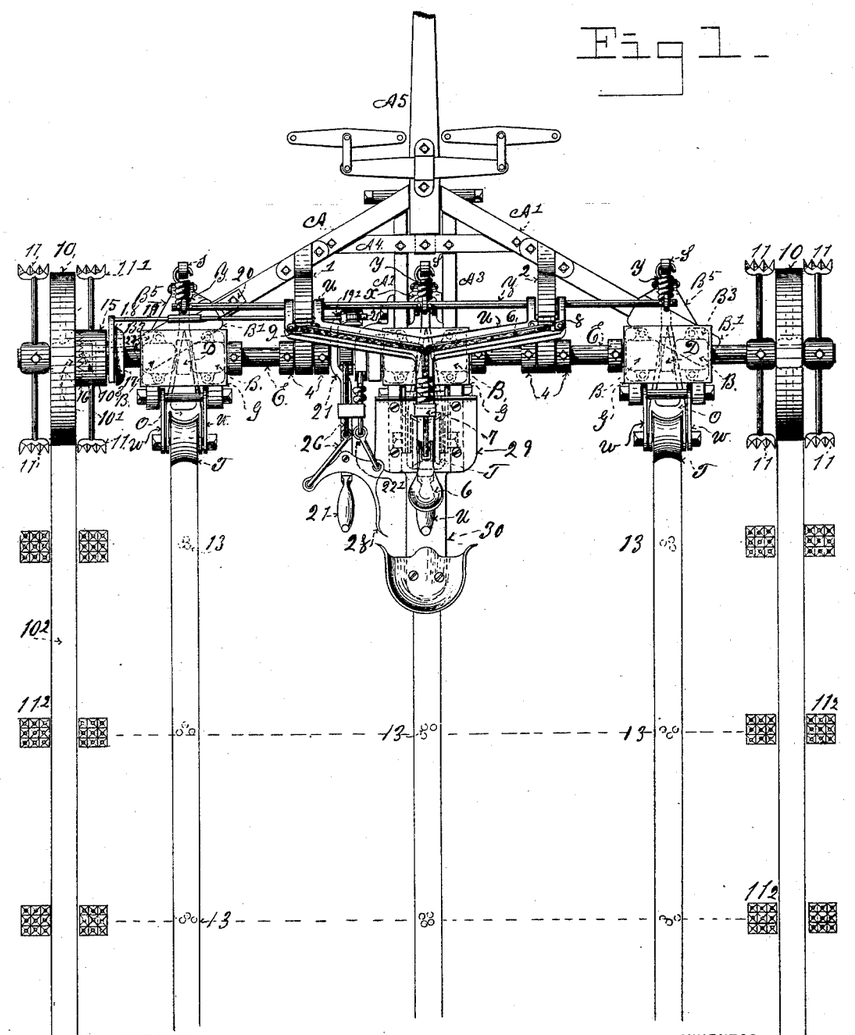
Figure 1 is a plan view of the planter.
Figures 6, 7:
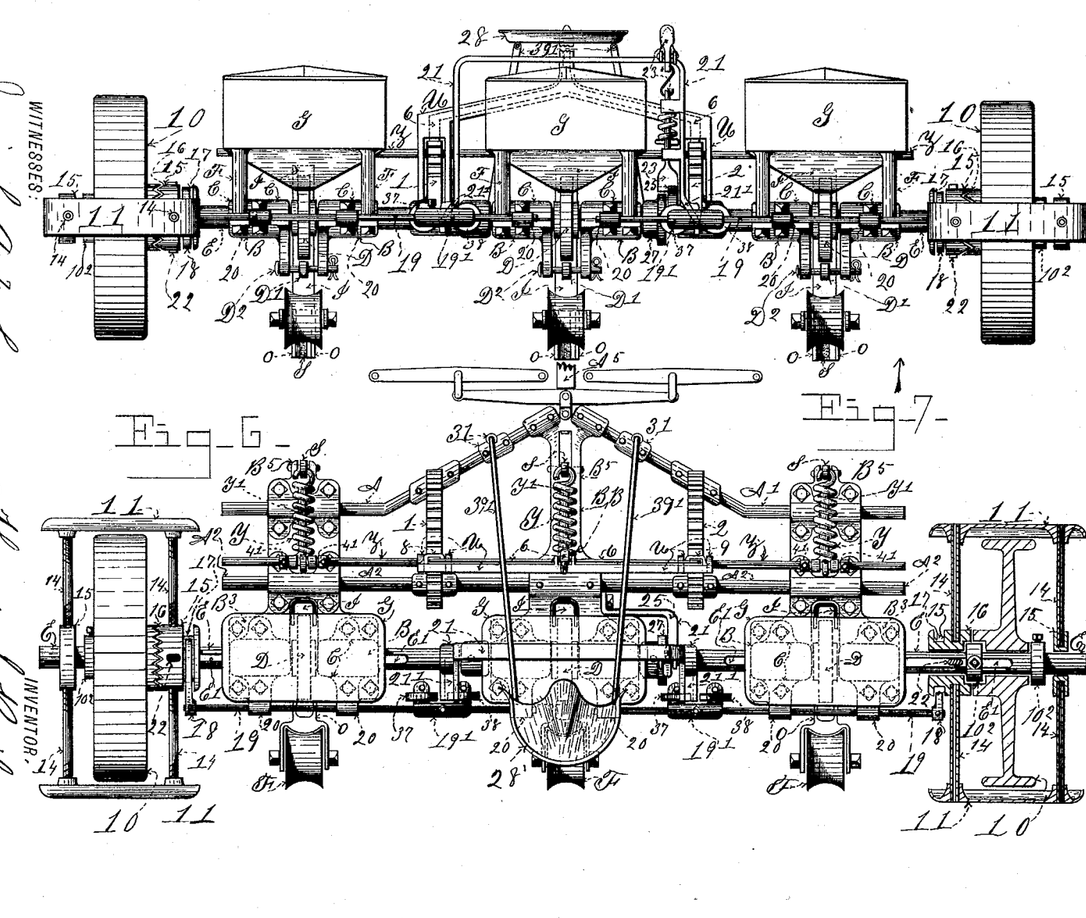
Fig. 6 is a plan view of the planter complete, showing a metallic tubular frame adapted to allow the rows to be increased or diminished in width.
Fig 7 is a rear elevation.
Figure 21:
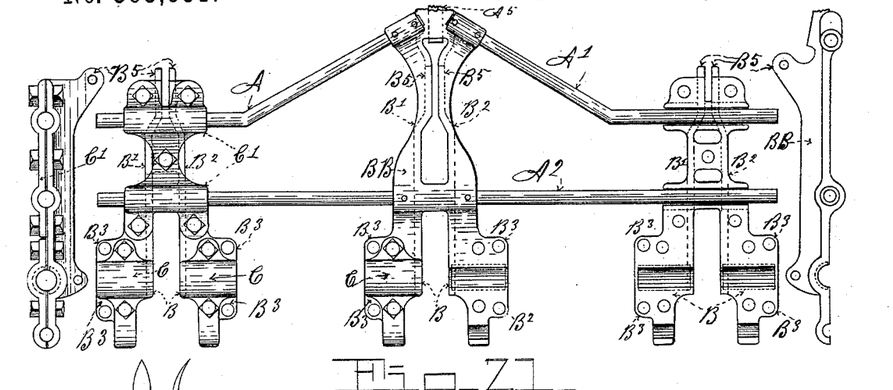
Fig. 21 is a plan view of the metallic frame of the planter.
Figure 22:
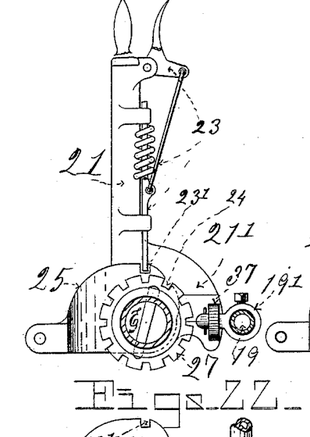
Figs. 22, 23, 24, and 25 are several views of the shipping mechanism for locking and unlocking the driving-wheels to the row-checkers and for locking and holding them from turning independently of the wheels.
Figures 23, 24:
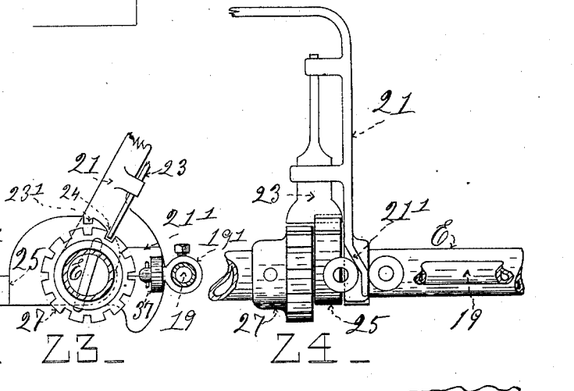

Referring to Fig. 1, the frame of my machine consists of the wooden pieces A, A', A², A³, and A⁴, which are arranged to support the tongue A⁵, and in Figs. 6 and 21 of metallic tubes or bars A, A', and A², these being secured to the middle bearing or boxes, B B, which are formed to support the tongue A⁵ and the whiffletrees. The ends of the frame-pieces are secured in the extending portions B' and B² of the boxes B, Figs. 1 and 4, which are formed to embrace them. The boxes B are arranged in pairs with a space between them, which is occupied by the dropping-disks D, which latter are secured to the axle E. The axle is preferably a metallic tube which passes through the boxes B and is free to revolve in them.

Figures 14, 15, 16, 17, 18, 19:
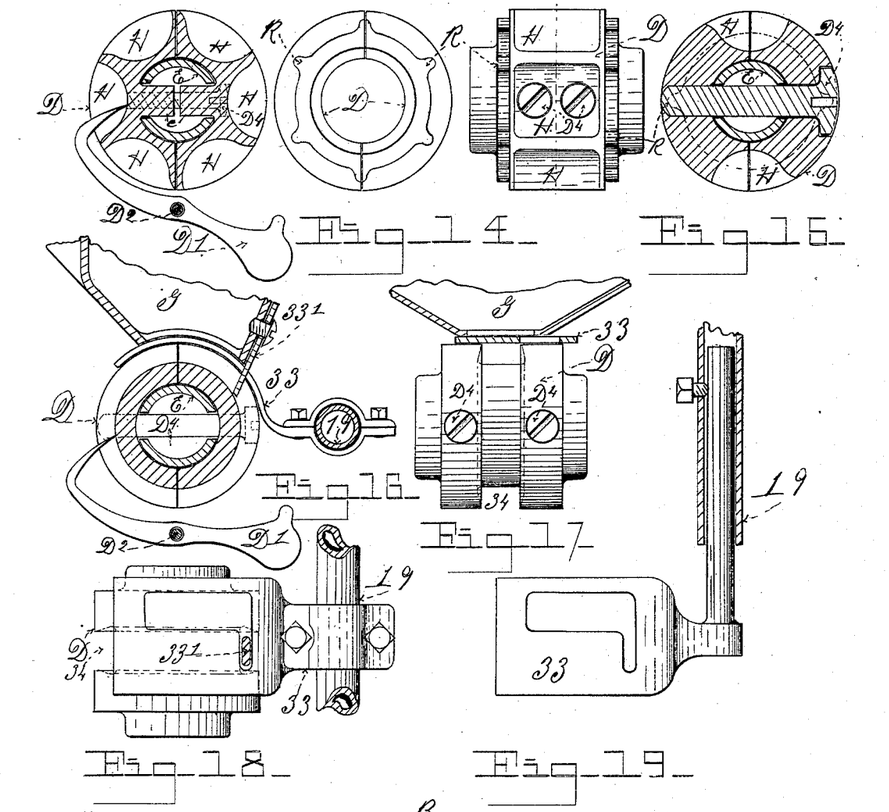
Fig. 14 represents three views of disks—a section, a side elevation, and end elevation—adapted to plant potatoes.
Fig. 15 is a sectional view of a disk designed to plant potatoes in hills, and it further shows a device for securing the halves of the disks together.
Figs. 16, 17, and 18 are three different views of a disk, with its attachments, designed to plant any kind of seed in a continuous row, especially cotton-seeds.
Fig. 19 is a detached view of the cut-off.
Figure 20:
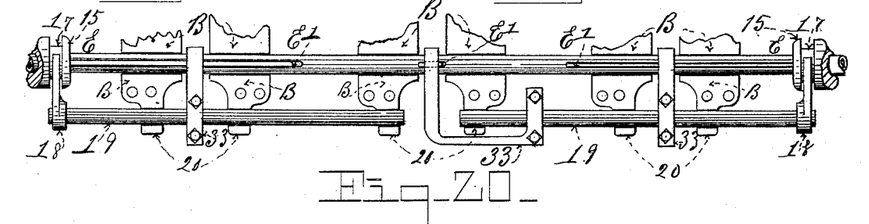
Fig. 20 is a plan view of portions of the bearings B and the shipping-rods 19, the object of this view being to show the position of the slides 33 on the rods 19. These slides are only used with disks 16, 17, and 18, they operating to open and close the opening in the bottom of the hoppers and also to control the flow of seed.

The boxes B are provided with a step, B³, which extends beyond the caps C on the outer ends of each pair of boxes. The lugs F, (see Fig. 3,) which extend from the bottom of the hopper G, rest on these steps and are bolted to them. This makes the hopper rigid with the frame and boxes and raises the body of it high enough above the caps C to remove them, if necessary. The bottom of the hopper G slopes on all sides toward the center, as shown by the lines G', G², G³, and G⁴, Fig. 3, and is cut away enough to allow the peripheral surface of the disk D to come in contact with the seed. The disks D are provided with two or more pockets, H, placed equidistant from each other on the surface of the disks. These pockets should be of a depth and diameter sufficient to hold from three to five kernels of the kind of seed adapted to each particular disk. The disks are formed of two halves, which enable them to be placed on or taken from the axle E without removing any portion of the planter. They are secured together by a bolt or bolts, D⁴, which pass through the slots E' in the axle E. They may or may not be provided with projections e, extending into the interior of the axle E, as shown in the sectional view of Fig. 14. Several disks accompany each planter, one especially for corn, (shown in Fig. 12,) one especially for potatoes in rows, one for planting potatoes in hills, Figs. 14 and 15, and one especially for cotton, Figs. 16, 17, and 18. The last-mentioned disk is adapted to the continuous dropping of any kind of seed, and differs from the disk used for planting seeds in hills in being provided with a groove, 34, in its periphery. When using this form of disk, it is necessary to attach to the hopper G the stop 33'. These stops extend into the grooves 34 and prevent the seed from running off on the wearing side of the disks; also, the slides 33 should be clamped to the rods 19. Figs. 19 and 20 represent two ways of securing the center slide to the end of one of the rods. In Fig. 19 a portion of it enters and is set-screwed to the rod, while in Fig. 20 it is clamped similar to the others.

The slides rest between the tops of the disks and the bottom of the hoppers, the disks of this form being made enough smaller in diameter to furnish this space. The slides are provided with an opening corresponding in length with that in the hopper and in width with the width of the groove in the disk. The opening should also surround the stop 33'.

A horizontal movement is imparted to the rods 19 by the lever 21. The extent of this movement being known, it is easy to adjust the slides on the rods to obtain as large or small an opening or flow of seed as desired. All the feed-disks are operated on by the fingers D', (see Figs. 11, 14, and 16,) they being pivoted at D² to extensions of the boxes B. They are formed to enter each and every recess in the disks and to expel any seeds that remain therein. One end, D', is weighted or provided with a spring, D³, attached to projections on the under side of the boxes B and top of the fingers. The fingers are used with all the varieties of disks, and their use makes them portion-droppers. They may also be made to be operated by a cam formed on one side of the disk.

Figures 25, 26, 27:
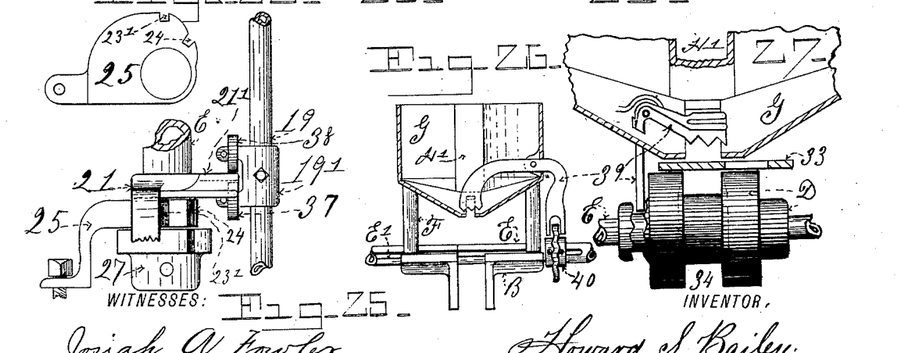
Fig. 26 is a vertical section of the hopper, showing the seed-agitator 39 and the cam 40 which drives it.
Fig. 27 shows a different arrangement of the agitator 39, it being adapted by scroll-cam formed in the hub of the dropping-disks to be kept in constant but limited motion while the planter is operating and to keep the seed from sticking or clogging in the hopper.

Each one of the hoppers is also provided with an agitator, 39. (See Figs. 26 and 27.) This is a device extending through the bottom of the hoppers on the sides and pivoted in such a manner that the end which is located just over the opening in the bottom of the hopper receives a slight vertical or horizontal movement from a cam, 40, secured to the axle E, or from a cam formed in the hub of one side of the disks. It prevents the seeds from sticking or clogging at the outlet.

Figures 3, 4, 5:
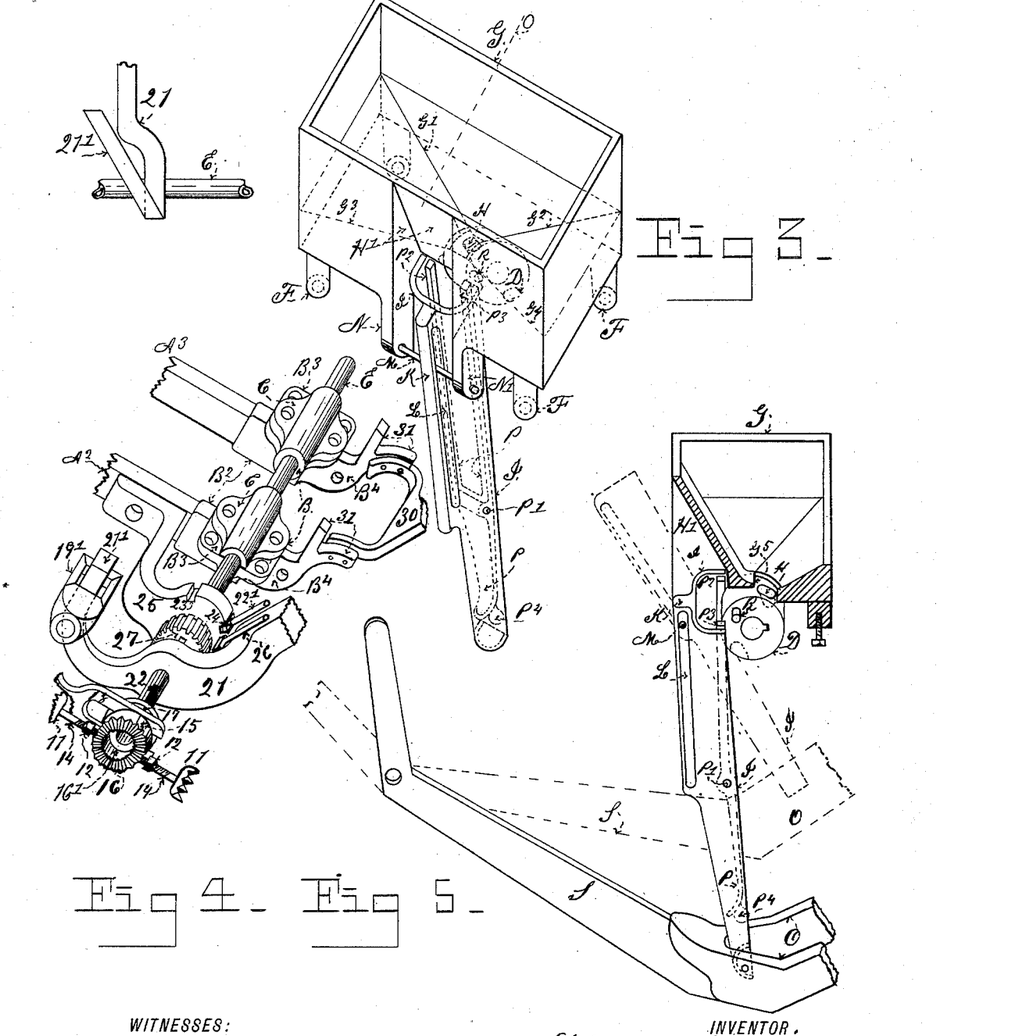
Fig. 3 is a perspective view of the hopper and dropping mechanism.
Fig. 4 is a perspective view of a part of the middle portion of the planter.
Fig. 5 is a perspective view of the dropping mechanism and section through the center of the hopper on the line $o$ of Fig. 3.
Figure 10:
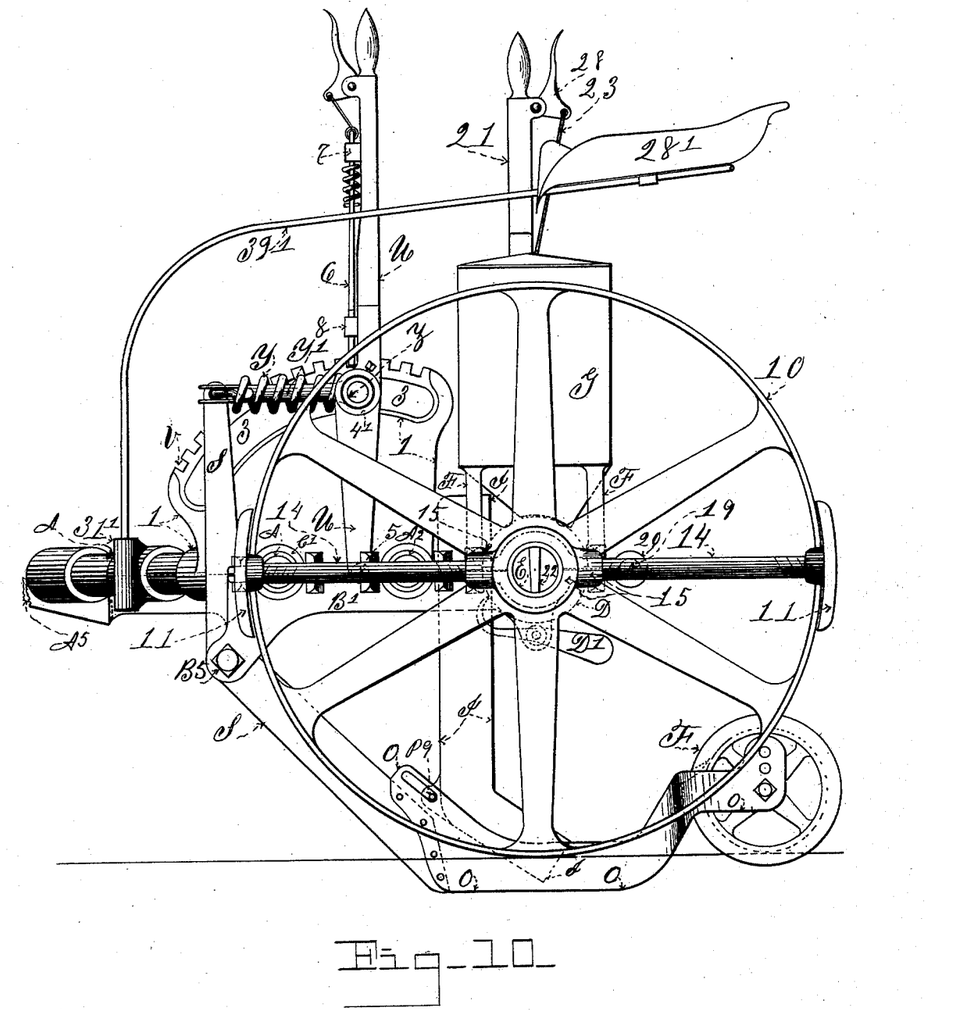
Fig. 10 is a side elevation.
Figure 11:
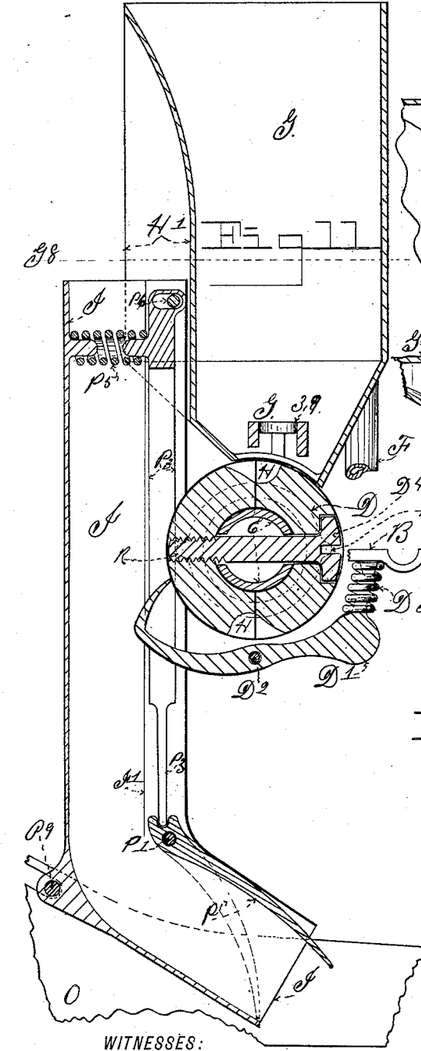
Fig. 11 is a sectional side elevation of the feeding and dropping mechanism on the line 35 of Figs. 12 and 13.
Figures 12, 13:
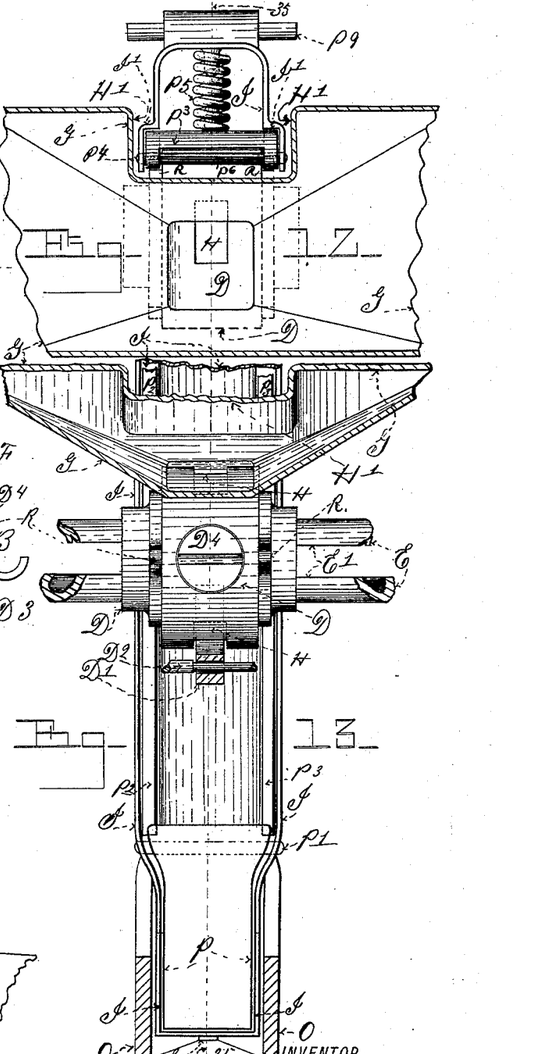
Fig. 12 is a horizontal section on line $G^8$.
Fig. 13 is a rear elevation of a portion of the dropping mechanism, also section across the furrow-openers.

The chutes I may be provided with a web, K, containing a long slot, L, through which the pin M passes. These may be attached to the downwardly-extending lugs N and N', forming part of the hoppers, Figs. 3 and 5. In Figs. 10, 11, and 12 a slightly different and preferable arrangement is shown. In these views the chute is inclosed on three sides by the recess H', which is formed in the hopper to allow it to partially inclose the disk and on the other side by the web and cap forming part of the bearings or boxes B. The lower ends of the chutes I pass into an open space formed in the plows O to receive them, and they are pivoted there at P². The tongue or cut-off P, Figs. 3, 5, and 11, is pivoted at P', inside of each chute, the lower end of which is curved to bear against the side of the chute and close the passage holding the seeds at this point until released by the pins R, which are secured to the sides of the disks or preferably by the projections R, (see Figs. 12, 13, 14, and 15,) which are a part of the disks. These projections, as the disks revolve with the axle, come in contact with the ends P² and P³ of the upper portion of the tongue or cut-off, pushing them back and opening the passage which is closed when the projections leave the ends by the weight P⁴, Figs. 3 and 5. Fig. 11 illustrates a preferable arrangement. This view represents a sectional side elevation across Figs. 12 and 13 on the line 35 of the entire dropping mechanism. These projections R (shown in Figs. 11 and 13) are located on each side of the dropping-disks and project at diametrically-opposite points, so that by their rotation the chute I is opened twice. They are thrown forward toward the disks by the springs P⁵ until they strike the pin P⁶ at the top, and also at the bottom until the passage is closed.

The outer diameter of the disk shown in Fig. 17 is the same as the diameter across the extremity of the projections R of the other disks. Consequently the tongue is held back continuously and the passage kept open when this form of disk is on the axle, or the tongue may be removed from the chutes, if desired, when this form of disk is used.

The plows O are secured to the knives or furrowers S. The plows or coverers are formed to carry the covering-wheels F. These are made much wider than the plow and of a form best suited to close the furrows and cover the seeds dropped therein.

Figure 2:
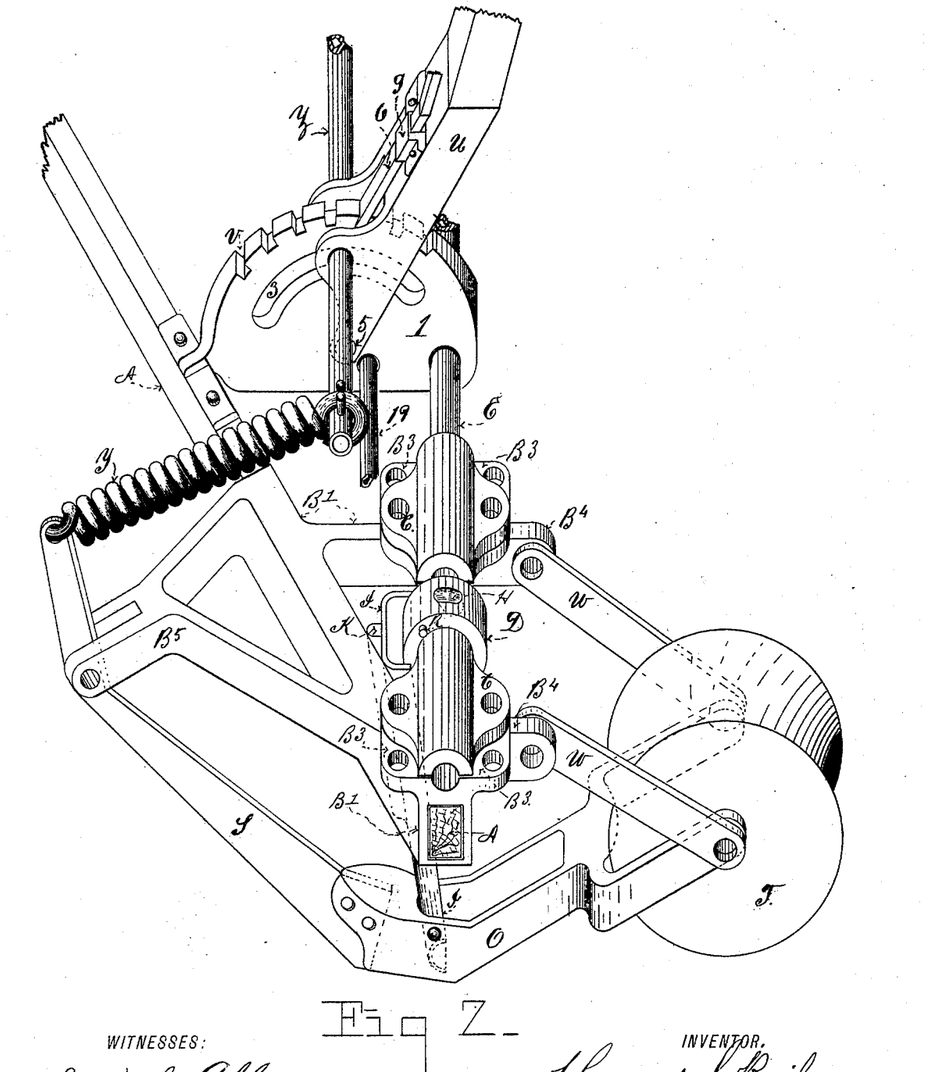
Fig. 2 is a perspective view of a portion of the planter.

The rods W, Figs. 1 and 2, extend from the wheels T to the extensions B⁴ of the boxes B to keep the wheels in line with the disks D; but as they are not absolutely necessary they are not shown in the other views.

The knives S are all pivoted to extensions B⁵ of the bearings B, and extend up between the extensions B' and B² of them. The springs Y unite the ends of the knives with the bar or tube Z and are secured to it. The tube Z passes through a slot in the supports 1 and 2, which are secured to the frame or the axle. The bar or tube Z also passes through and is carried by the lever U. This lever is formed to straddle the supports and is pivoted to each at 5. This lever is provided with a spring draw-bolt, 6, by which it is secured in the notches V on top of the quadrant-support. The draw-bolt is supported by the clips 7 and 8, which are cast onto the lever U. When it is desired to plant seed, the lever is drawn back, as represented in Fig. 10. This places the springs under tension and keeps the covering-wheels hard on the ground and also independent of each other enough to follow any unevenness in the ground that would be met in the small space the planter occupies. When it is necessary to raise the knives, plows, wheels, and chutes from the ground, the lever U is carried forward and locked in one of the notches V. The dotted lines in Fig. 5 represent the position assumed by these devices when this is done. When the lever U is moved forward and the tension of the spring taken up, the brace Y', Fig. 10, which is attached to the tube and is also surrounded by the springs, is forced against the ends of the knives, making a rigid connection between the tube Z and the knives S to raise the several pieces connected with them from the ground. The springs Y and the braces Y' are pivotally attached to the tube Z and are secured by the collars 4'. The ends of the braces Y' may be made to straddle the knives, as in Fig. 10, or to abut against them, as in Fig. 6.

The driving-wheels 10 are free to revolve on the axle E, and are held in place by the collars 102. The driving-wheels are located on the axle at a distance from the end dropping-disks equal to one-half the distance the disks or rows are apart. The diameter of the wheels regulates the distance apart of the hills, especially in planting corn, and, as there is a general gage used by farmers and by manufacturers of corn-planters and cultivating machinery, the wheels should be of a diameter that will plant two or more hills with one revolution, five being preferable. The disks will then contain two recesses, placed diametrically opposite, as shown in Fig. 11, which represents a corn-planting disk.

The row-checkers 11 are secured to the axle by the feather 22, which latter passes through the slot in the axle E. The row-checkers 11 may be placed on each side of each wheel, as in Fig. 1; or they may be united over the top, as in Figs. 6 and 7, and they may be given any form that will best distinguish these impressions.

The rods 14 may be lengthened by loosening the nuts 12, in Fig. 4, and unscrewing them.

The dropping-disks D would be placed on the axle in a position that will allow the projections R to operate on the tongue P and release the seeds and allow them to drop in line with the center of the impressions made by the row-checkers.

One hub of the row-checkers is corrugated at 16 and matches a similar corrugation on the hubs of the wheels, the two forming a clutch. The hub of the row-checkers is provided with a neck, 17. This is straddled by the yokes 18, secured to the operating-rods 19, which have bearings in the extensions 20, forming part of the bearings B and the caps C, Figs. 6, 20, and 21. The castings 19' are adjustably secured to these rods 19, and they are provided with projections supporting the friction-rollers 37 and 38. Between and on the rollers the inclined portions of the lever operate, producing a horizontal movement of the rods 19, which locks and unlocks the row-checkers and the axle with the wheels. (See Figs. 22, 23, 24, and 25.)

Figures 8, 9:
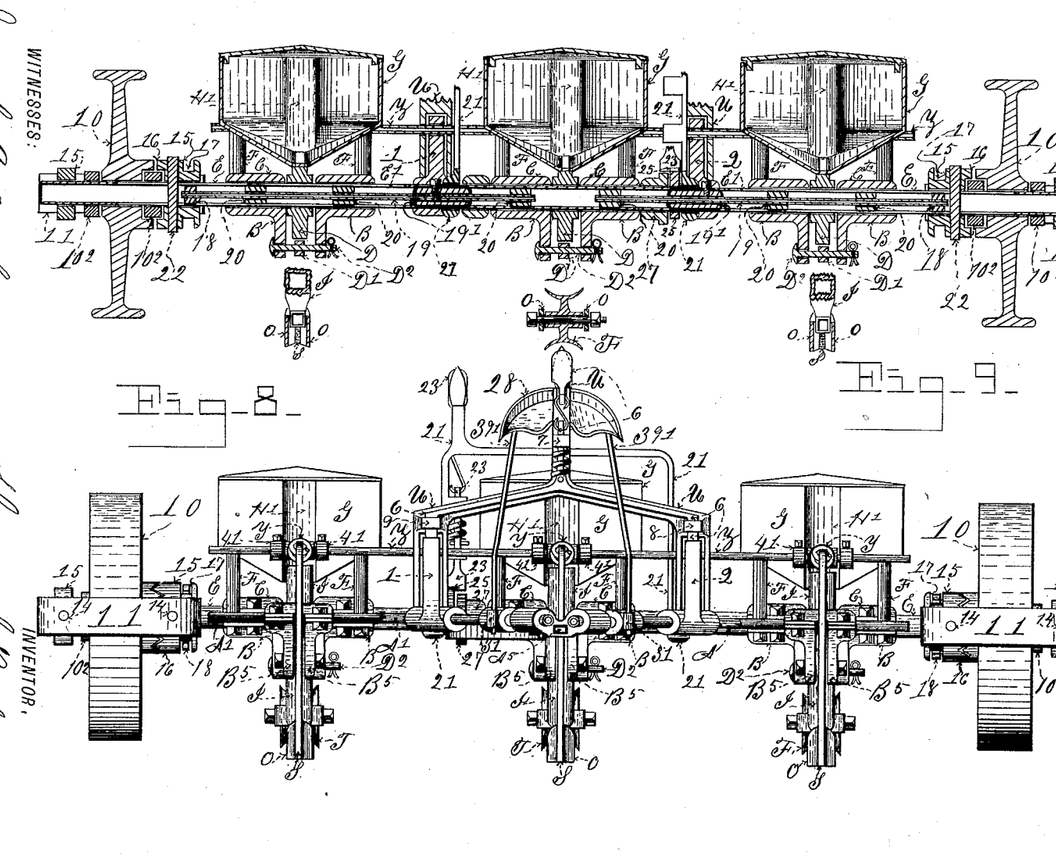
Fig. 8 is a front elevation.
Fig. 9 is a sectional elevation of Figs. 1 and 6.

The lever 21 surrounds the axle E, and if both driving-wheels are attachable to the row-checker and axle, as represented in Figs. 6, 7, 8, and 9, the lever is formed to straddle the center hopper, as shown in Figs. 6, 7, and 8. This allows both rods 19 and clutches to be locked or unlocked at one movement of the lever. If only one wheel is to be used to drive the axle and row-checkers, the arrangement shown in Fig. 1 is the preferred one. The lever 21 is provided with a spring draw-bolt, 23, which operates to secure the lever in the notches 23' and 24 of the support 25, which is secured to the side of the center bearings, B B. The end of the draw-bolt is made wide enough to operate also on the notched wheel 27, which is rigidly secured to the axle. When the lever 21 is locked in the notch 23' of the casting 25, the row-checkers and axle are locked to the driving-wheels. When the lever is drawn back to the notch 24 of the casting 25, the axle and row-checkers are free from the wheels. The wheels then revolve on the axle, which is held from turning by being locked by the draw-bolt to the casting 25, the notch 24 in the casting corresponding in height and width with the notches in 27 for this purpose.

It will be noticed that the inclined portion of the fin 21' of the lever 21, which gives the horizontal movement to the rods 19, is straight both above and below the incline. The straight portion above the incline enables the driver to carry the lever downward to catch the notches in the wheel 27, by which means he can turn the axle and set the row-checkers when necessary without moving the rods 19, as the straight part simply moves up and down between them. Having set the row checkers he has only to withdraw the bolt and throw the lever to the notch 23', which locks the clutches and attaches the wheels to the row-checkers and axle. The seat in Fig. 10 is represented as attached to projections 31 of the middle bearings, B. Figs. 6 and 10 represent a preferable arrangement in which the seat 28' is attached to rods or tubes 39'. These are attached to the frame-pieces A and A' by the clips 31'.

To operate this row-checking planter, the driver only has to keep the driving-wheels 10 alternately in their own ruts. Thus in Fig. 1 if the driver on reaching the edge of the field turns to the left the left-hand wheel is driven back across the field in its own rut 10², which is the line to drive by, while the right-hand wheel makes a new rut to be used by it on the return trip. When the driver turns a corner, he squares the planter with the wheel in the rut and then sets the row-checkers in the last checks made by them on the last row. He then throws in the clutch and proceeds, the row-checkers on one side coming into (as they revolve with the wheel) the impressions they make when going the other way, while the row-checkers on the other side check new rows. Should any obstructions be met with, he has only to stop and reset them.

The essential features of this planter consist, first, of a frame provided with suitable bearings or boxes in which the axle is free to revolve, the axle provided with disks secured to it with their peripheries extending into hoppers placed over them and secured to the said bearings of the disks as they revolve with the axle, catching the corn in inclined recesses on their peripheries and depositing it in chutes which convey it to the ground; secondly, of the plowing and covering mechanism which consists of knives with plows or shoes attached extending into the ground, provided with a space in which are secured the chutes that convey the corn into the ground, and the covering-wheels which are attached to the plows in a position to close the furrows and cover the corn, the lever mechanism for operating these knives, and their attachments with which they can all be raised or lowered at once and with which each will be independent when at work; thirdly, the row-checkers and wheels, the wheels placed on the axle at a distance from the dropping mechanism, which enables the ruts made by them to be used as guide lines or paths in which one wheel is always to be kept, the row-checkers, which are essentially a part of the axle, making impressions on one or both sides of the ruts made by the wheels at right angles to them and in line with the corn-planter, and the mechanism for connecting the axle to the driving wheel or wheels and for turning and adjusting the row-checkers.

Having described my invention, what I claim as new, and desire to secure by Letters Patent, is—

1. In a planter, the combination, with a frame, journal-boxes, and an axle revolubly supported in said boxes, of hoppers and vibratory seed-agitators in said hoppers.

2. In a planter, the combination, with a frame, journal-boxes, and an axle revolubly supported in said boxes, of hoppers secured to the boxes, a vibratory seed-agitator, and a cam for operating the seed-agitator.

3. In a planter, the combination, with a frame, journal-boxes secured to the frame, and an axle revolubly supported in said boxes, of hoppers secured to the journal-boxes, a seed-agitator pivoted to each hopper, and a cam-wheel mounted on the axle and adapted to operate said agitator, substantially as set forth.

4. In a planter, the combination, with a frame, an axle revolubly supported therein, and a set of hoppers secured to the frame, of the longitudinally sectional grain-dropping disks and screws extending through the sections and axle, whereby the sections of the disks are held together and on the axle, substantially as set forth.

5. In a planter, the combination, with a frame, an axle revolubly supported therein, and grain-dropping disks secured to the axle, said disks having notches at intervals in their peripheries, of fingers pivoted in close proximity to the disks with one end normally in contact with the periphery of the disk and adapted to enter the notches for removing the grain therefrom as the disk revolves, substantially as set forth.

6. In a planter, the combination, with a frame, an axle revolubly supported therein, and grain-dropping disks secured to the axle and having grain recesses or pockets in their peripheries, of grain-ejector fingers pivoted in close proximity to the disks and springs, or similar means for forcing the fingers in and out of the pockets with the rotation of the disks, substantially as set forth.

7. In a planter, the combination, with a frame, a shaft revolubly supported therein, and grain dropping disks secured to the shaft, said disks having grain pockets therein, and fingers for removing the grain from said pockets as the disks revolve, of a discharge-chute and a tongue pivoted in the chute for opening and closing the same with the rotation of the disks, substantially as set forth.

8. In a planter, the combination, with a frame, an axle revolubly supported therein, and grain-dropping disks secured to said shaft, and each dropping-disk having a lug or projection thereon, of a grain-discharge chute, a tongue pivoted therein, and a spring-actuated lever loosely connected with the tongue and adapted to operate the latter as it is engaged by the lug or projection in the disks, substantially as set forth.

9. In a planter, the combination, with a frame, a shaft revolubly supported therein, and grain-discharging disks secured to the shaft, said disks having recesses therein, of fingers pivoted in close proximity to the disks and adapted to remove the grain from the disks, and a stop projecting into the recess at a point opposite the finger to prevent the passage of grain on the wrong side of the disks, substantially as set forth.

10. In a planter, the combination, with a frame, a shaft revolubly supported therein, and a hopper secured to the frame, of disks secured to the shaft, said disks each having a recess therein, a slide for regulating the supply of grain to the disks, and a stop projecting through the slide into the recess in the disk, substantially as set forth.

11. In a planter, the combination, with frame and a lever pivoted thereto, of a plow pivoted to the frame, a spring connecting the lever and plow, and a covering-wheel journaled in the rear end of the plow, substantially as set forth.

12. In a planter, the combination, with a frame and lever pivoted thereto, of a plow also pivoted to the frame, and a spring connecting the lever and plow, the latter having an open center and a covering-wheel of greater width than the plow journaled in the rear end thereof, substantially as set forth.

13. In a planter, the combination, with a frame and a lever pivoted thereto, of a plow pivoted to the frame, a spring connecting the plow and lever, said plow having an open center, and a grain-chute leading into the opening, substantially as set forth.

14. In a planter, the combination, with a frame and a lever pivoted thereto, of a plow having an open center pivoted in the frame, one end thereof projecting over its pivot, a spring connecting this upper end with the pivoted lever, and grain-chutes leading into the opening in the plow.

15. In a planter, the combination, with a frame, hoppers secured thereto, an axle removably supported in the frame, and grain-dropping disks secured to the shaft, of plows pivoted to the frame, said plows having openings therein, a lever for raising and lowering the plow, a spring connecting the plow and lever, and grain-chutes leading from the hoppers to the opening in the plow, substantially as set forth.

16. In a planter, the combination, with a frame, a notched and slotted segmental support, a lever pivoted to the latter and adapted to be locked thereto in different positions, of a plow pivoted to the frame, and a spiral spring connecting the lever with the upper end of the plow, substantially as set forth.

17. In a planter, the combination, with a frame, notched and slotted segmental supports thereon, a rod extending through the slot, a lever pivoted to the supports and connected with the said rod, plows pivoted to the frames, spiral springs connecting the plows and rod, and braces connected with the rod and extending loosely through the spiral springs and adapted to abut against the end of the plow, substantially as set forth.

18. In a planter, the combination, with a frame, journal-boxes secured thereto, and a shaft revolubly supported in the boxes, of plows pivoted to the frame, said plows having covering-wheels journaled in their rear ends, and links or bars pivotally connecting the rear ends of the plows with the journal-box.

19. In a planter, the combination, with a frame, journal-boxes secured thereto, and an axle revolubly supported in said boxes, of plows pivoted to the frame, said plows having covering-wheels in the rear ends, and links or bars pivotally connecting said rear ends with the journal-boxes, levers for raising and lowering the plows, and a yielding connection between the levers and plows, substantially as set forth.

20. In a planter, the combination, with a rotary axle, of ground-wheels loosely mounted on the axle, row-checkers loosely mounted on the axle spanning the wheels, and means for locking said row-checkers to the axle, substantially as set forth.

21. In a planter, the combination, with a rotary axle, ground-wheels loosely mounted thereon, and row-checkers adapted to slide on the axle, of a yoke connected with each row-checker, and a rod connected with the yoke, rollers on said rod, and a cam-lever loosely mounted on the axle, with one end extending between the rollers on the rod and adapted by its lateral movement to shift the rod backward or forward, substantially as set forth.

22. In a planter, the combination, with a frame and an axle revolubly supported therein, ground-wheels loosely mounted on the axle, and row-checkers adapted to slide upon the axle, of yokes loosely connected with the row-checkers, rods extending from said yokes toward each other, the latter having friction-rollers thereon, a lever loosely mounted on the axle and having a cam end extending loosely between the rollers on the rods, said lever adapted when moved to lock or unlock the axle to the frame and by the movement of its cam end between the rollers on the rods to simultaneously reciprocate said rods, substantially as set forth.

HOWARD S. BAILEY.

Witnesses:
JOSIAH ALBERT FOWLER,
FRED F. HALL.